US 7,967,337 B2

(12) United States Patent
Misaki et al.

(10) Patent No.: US 7,967,337 B2
(45) Date of Patent: Jun. 28, 2011

(54) ARRANGEMENT OF A COWL STAY ON A MOTORCYCLE, AND MOTORCYCLE INCORPORATING SAME

(75) Inventors: Kenichi Misaki, Saitama (JP); Kazuyoshi Kuroki, Saitama (JP); Takeshi Kuroe, Saitama (JP); Ippei Kawamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 154 days.

(21) Appl. No.: 12/378,022

(22) Filed: Feb. 10, 2009

(65) Prior Publication Data

US 2009/0206628 A1 Aug. 20, 2009

(30) Foreign Application Priority Data

Feb. 19, 2008 (JP) ................. 2008-037618

(51) Int. Cl.
*B62D 24/00* (2006.01)
*B62D 25/08* (2006.01)

(52) U.S. Cl. ............. 280/781; 280/730.1; 180/219; 296/192

(58) Field of Classification Search ............ 180/219; 280/730.1, 781; 296/192, 193.02, 203.02
See application file for complete search history.

(56) References Cited

U.S. PATENT DOCUMENTS

| | | | |
|---|---|---|---|
| 4,744,434 A * | 5/1988 | Miyakoshi et al. | 180/219 |
| 4,852,678 A * | 8/1989 | Yamaguchi | 180/219 |
| 5,012,883 A * | 5/1991 | Hiramatsu | 180/225 |
| 6,588,529 B2 * | 7/2003 | Ishii et al. | 180/219 |
| 7,094,267 B2 * | 8/2006 | Inayama | 55/385.3 |
| 7,360,620 B2 * | 4/2008 | Takenaka et al. | 180/291 |
| 7,690,474 B2 * | 4/2010 | Iwashita et al. | 180/374 |
| 2003/0189323 A1 | 10/2003 | Akiyama et al. | |
| 2005/0133283 A1 * | 6/2005 | Horii | 180/65.1 |

FOREIGN PATENT DOCUMENTS

| | | |
|---|---|---|
| CN | 1410300 A | 4/2003 |
| DE | 93 10 544.4 | 9/1993 |
| DE | 10243561 A1 | 5/2003 |
| JP | 6-199261 A | 7/1994 |
| JP | 9-328087 | 12/1997 |
| JP | 2003-104153 A | 4/2003 |
| JP | 3503889 | 12/2003 |
| JP | 2004-136790 A | 5/2004 |
| JP | 2007-069793 | 3/2007 |
| JP | 2007-083882 A | 4/2007 |

* cited by examiner

*Primary Examiner* — Faye M. Fleming
*Assistant Examiner* — Drew Brown
(74) *Attorney, Agent, or Firm* — Carrier Blackman & Associates, P.C.; Joseph P. Carrier; William D. Blackman

(57) ABSTRACT

A motorcycle includes a head pipe, left and right main frames extending rearwardly from the head pipe on left and right sides, respectively, and a cowl stay extending forwardly from the left and right main frames and supporting a cowling, which protectively covers a front portion of the motorcycle. The cowl stay is positioned such that its front end portion is located rearwardly of a front end portion of a front wheel, and in front of a tip portion of a head light disposed on a front portion of the head pipe so as to illuminate an area in front of the motorcycle. The cowl stay is disposed at a position located above a center of gravity of the motorcycle.

17 Claims, 7 Drawing Sheets

EMBODIMENT

COMPARATIVE EXAMPLE

ARRANGEMENT OF A COWL STAY ON A MOTORCYCLE, AND MOTORCYCLE INCORPORATING SAME

CROSS-REFERENCE TO RELATED APPLICATIONS

The present application claims priority under 35 USC §119 based on Japanese patent application No. 2008-037618, filed on Feb. 19, 2008. The entire subject matter of this priority document, including specification, claims and drawings thereof, is incorporated by reference herein.

BACKGROUND OF THE INVENTION

1. Field of the Invention

The present invention relates to an arrangement of cowl stay on a motorcycle. More particularly, the present invention relates a motorcycle incorporating a cowl stay for supporting a cowling, which covers a front portion of the motorcycle.

2. Description of the Background Art

There is a known motorcycle having a cowl stay which extends in front of a head pipe and which supports a cowling covering a front portion of the motorcycle. An example of such motorcycle having cowl stay is disclosed in the Japanese Patent No. 3503889, particularly in FIG. 1 thereof.

As shown in FIG. 1 of the Japanese Patent No. 3503889, a cowl stay 9 (the same reference symbols as used in the patent document are used here and herein) is adapted to fix a cowling 1 to the body frame side, a rear end portion of a center bracket 21 of the cowl stay 9 is fixed to a head pipe 3, and a pair of mounting pieces 27, 27 constituting the cowl stay 9 are fixed to a down tube 6 forming the main frame.

According to the Japanese Patent No. 3503889, a front end portion of the cowl stay 9 is disposed on a rear side in relation to a front end portion of a head lamp unit 11. Therefore, for example, when an impact force inclusive of an excessively strong shock or the like is inputted from the front side, the impact force is received by the front wheel, and is not absorbed by the cowl stay 9.

In order to absorb the impact force by the cowl stay 9 effectively, the attitude of the vehicle has to be changed significantly. In other words, in the Japanese Patent No. 3503889, the cowl stay 9 appears to be not configured in view of absorption of impact.

Besides, in recent years, a motorcycle provided with an air bag module 20 (the reference symbol used in the relevant document is used here and hereinafter) on the front side of a seat occupied by an operator of the motorcycle has been known (refer to, for example, the Japanese Patent Laid-Open No. 2007-69793 (FIG. 7)

As shown in FIG. 7 of the Japanese Patent Laid-Open No. 2007-69793, the motorcycle include air bag module 20 (the reference symbol used in the relevant document is used here and hereinafter) which incorporates an air bag for effectively protecting the rider(s) when an impact force inclusive of an excessively strong shock or the like is exerted from the front side of the motorcycle.

It may be noted, however, that the Japanese Patent Laid-Open No. 2007-69793 suggests protecting the rider(s) with the air bag, but a vehicle-body configuration for making the air bag function more effectively is not taken into consideration in the disclosure of this document.

The present invention has been made to overcome such drawbacks of the existing arrangement of cowl stay for a motorcycle. Accordingly it is an object of the present invention to provide an arrangement of a cowl stay on a motorcycle such that an attitude of a motorcycle can be sustained appropriately when an excessively strong impact force is exerted on the motorcycle from the front side of the motorcycle.

SUMMARY OF THE INVENTION

In order to achieve the above objects, the present invention according to a first aspect thereof provides a motorcycle having a head pipe, main frames extending from the head pipe toward rear left and right sides, and a cowl stay extending towards a front side of the left and right main frames and supporting a cowling covering the motorcycle.

The first aspect of the present invention is characterized in that the cowl stay is disposed such that, when viewed in side view of the motorcycle, a front end portion the cowl stay is located rearwardly of a front end portion of a front wheel, and in front of a tip portion of a head light, arranged on a front portion of the head pipe, so as to illuminate an area in front of the motorcycle.

The present invention according to a second aspect thereof is characterized in that the cowl stay is disposed at a position located above the center of gravity of the vehicle.

The present invention according to a third aspect thereof is characterized in that the cowl stay is mounted on the main frames.

The present invention according to a fourth aspect thereof is characterized in that the cowl stay includes left and right main cowl stay members extending forwardly from the main frames, a cross member connecting front ends of the main cowl stay members to each other, and left and right slant members connecting the main cowl stay members and the main frames to each other.

The present invention according to a fifth aspect thereof is characterized in that connecting points (also referred as connecting elements) at which the main stay members are mounted on respective main frames and connecting points at which the slant members are mounted on respective main frames are different from each other.

The present invention according to a sixth aspect thereof is characterized in that, when viewed in side view, each of the slant members is formed in a substantially inverted V shape pointing upwardly.

The present invention according to a seventh aspect thereof is characterized the cowl stay further includes a center arm extending forwardly from the head pipe, and arm members connecting the center arm to the main cowl stay members.

The present invention according to a eighth aspect thereof is characterized a seat, occupied by an operator while operating the motorcycle, is disposed on the rear side of the main frames, and an air bag module is disposed at position proximate to a front portion of the seat.

EFFECTS OF THE INVENTION

According to the first aspect of the present invention, the cowl stay is disposed such that, when viewed in side view of the vehicle, a front end portion thereof is located rearwardly of a front end portion of a front wheel, and in front of a front end portion of a head light disposed on the front portion of the head pipe so as to illuminate an area in front of the vehicle.

When the motorcycle receives an excessive shock from the front side, first, the front wheel collides against the object, and then a front fork contracts so as to absorb the shock and the vehicle body inclusive of the main frames falls along the front fork. In this instance, since the front fork is disposed with its upper end portion inclined to the rear side, the vehicle body falls and, simultaneously, moves to the front side relative to the position of the front wheel, and a front end portion of the cowl stay comes into contact with the object. Then, the shock is received by the front wheel and the cowl stay.

Since the shock is received at two points, i.e., by the front wheel and the cowl stay, the change in attitude of the motorcycle can be suppressed, as compared with a case in which the shock is received by only the front wheel.

In this case, when the spacing between the front wheel and the cowl stay in the vertical height direction is secured in a predetermined amount, the change in the attitude of the motorcycle can be desirably suppressed.

According to the second aspect of the present invention, the cowl stay is disposed at a position located above the center of gravity of the vehicle. Therefore, when the motorcycle receives an excessively strong impact force from the front side, a holding force from above the center of gravity of the vehicle is exerted, whereby the change in the attitude of the motorcycle can be suppressed more, as compared with a case where the cowl stay is disposed below or at the same level as the center of gravity of the vehicle.

According to the third aspect of the present invention, the cowl stay is mounted on the main frames. Therefore, the mounting strength of the cowl stay can be enhanced largely, as compared with the case where the cowl stay is mounted only to the head pipe.

According to the fourth aspect of the present invention, the cowl stay includes a cross member connecting the front ends of the main cowl stay members to each other and left and right slant members connecting the main cowl stay members and the main frames to each other. Therefore, the strength of the cowl stay can be enhanced, as compared to a case where the cowl stay includes only the main cowl stay members.

In addition, by utilizing the main stays and the slant members, it is possible, for example, to mount a regulator, a battery and a control unit on the slant members or the like. Since various components can thus be mounted, the degree of freedom in layout of the components in a front portion of the motorcycle can be enhanced largely.

According to the fifth aspect of the present invention, the main stay member and the slant member are mounted to the main frame at different points, respectively. Therefore, when a shock is inputted to the main stay member from the front side, the slant member supports the main stay member so as to suppress bending of the main stay member. Since an input exerted from the front side is received at a plurality of different points, the rigidity of the cowl stay can be enhanced. With the rigidity of the cowl stay enhanced, the change in the attitude of the vehicle can be more suppressed.

According to the sixth aspect of the present invention, the slant members are each formed in a substantially inverted V shape. Therefore, when a strong shock is inputted from the front side, the main cowl stay members are bent, and, since the slant members are each formed in a substantially inverted V shape, the slant members are liable to be bent into an upwardly projected shape at the vertex portion of the substantially inverted V shape. In this case, since the spacing between the main stay member and the slant member is enlarged, the possibility of a change in the attitude of the vehicle can be lowered.

According to the seventh aspect of the present invention, the cowl stay includes a center arm and arm members connecting the center arm to the main cowl stay members, so that the rigidity of the cowl stay can be further enhanced. Since the main cowl stay members provided in the cowl stay are each supported by the center arm and the arm portion in addition to the slant member, the possibility of concentration of a load on the slant member can be lowered, as compared with a case in which only the slant members are provided as reinforcing members. With the possibility of concentration of a load on the slant member lowered, the slant member can be made lighter in weight, and the cowl stay as a whole can be made lighter in weight.

According to the eighth aspect of the present invention, a seat occupied by a rider or riders while operating the vehicle is provided on the rear side of the main frames, and an air bag module is provided at a position proximate to a front portion of the seat.

When an input such as an excessively strong shock is exerted on the cowl stay, the change in the attitude of the motorcycle can be suppressed by the cowl stay, so that the rider(s) are appropriately protected when the air bag is inflated.

For a more complete understanding of the present invention, the reader is referred to the following detailed description section, which should be read in conjunction with the accompanying drawings. Throughout the following detailed description and in the drawings, like numbers refer to like portions.

DETAILED DESCRIPTION OF ILLUSTRATIVE EMBODIMENTS

It should be understood that only structures considered necessary for illustrating selected embodiments of the present invention are described herein. Other conventional structures, and those of ancillary and auxiliary components of the system, will be known and understood by those skilled in the art.

Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

An illustrative mode for carrying out the present invention is described below, based on the accompanying drawings.

Figure 1:
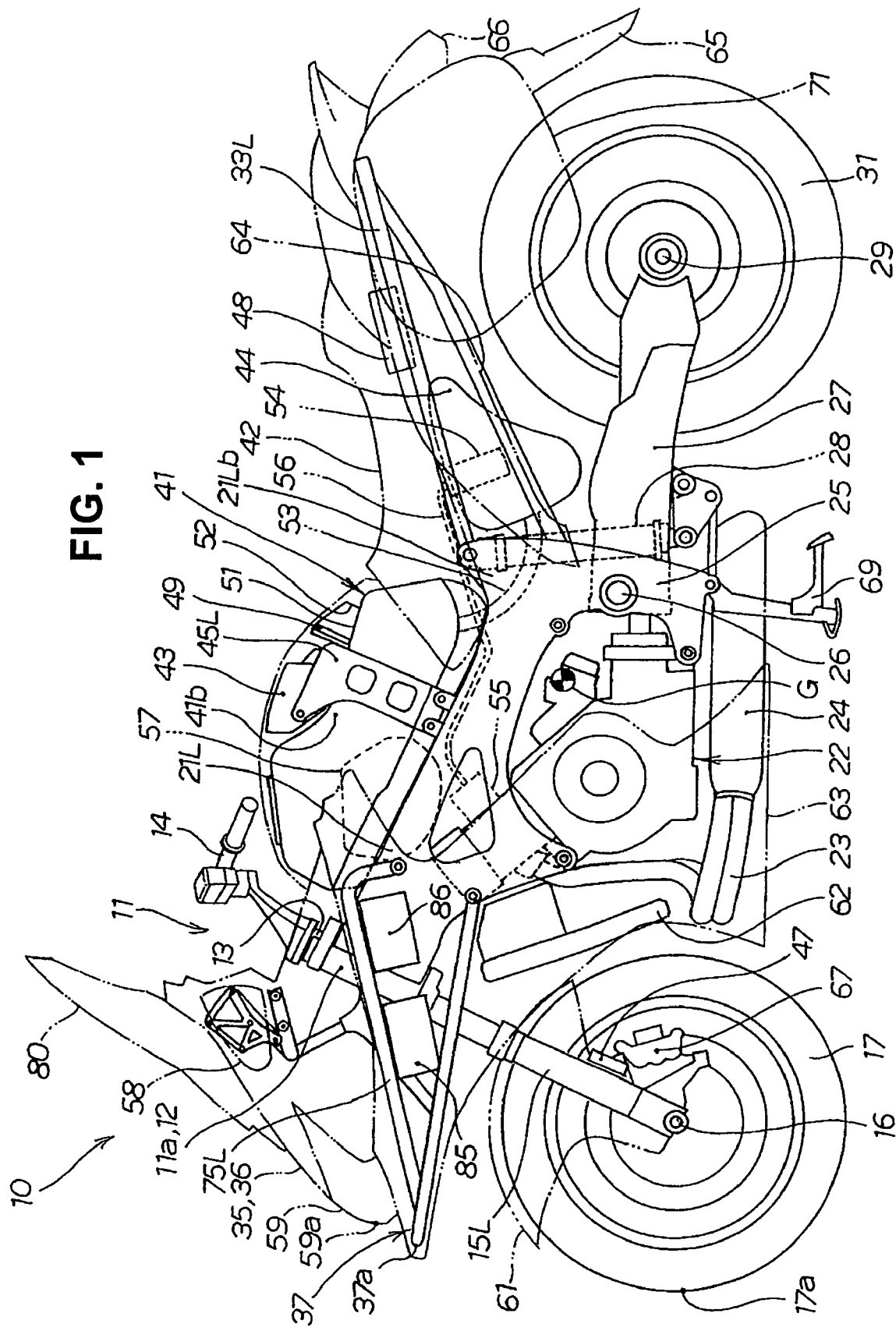
FIG. 1 is a left side view of a motorcycle according to the present invention.

FIG. 1 is a left side view of a motorcycle according to the present invention. The motorcycle 10 includes, as main components thereof, a head pipe 12 provided at a front end portion 11a of a body frame 11; a steering handle 14 pivotally provided at the top of the head pipe 12 through a steering shaft 13; left and right front forks 15L, 15R (only 15L on the viewer's side is shown in the drawing, here and hereinafter) connected to the steering shaft 13 and having a cushion function for absorbing vibrations and the like that the vehicle receives from the road surface.

The motorcycle 10 further includes a front wheel 17 rotatably mounted to a front wheel axle 16 arranged between lower end portions of the front forks 15L, 15R; main frames 21L, 21R (only 21L on the viewer's side is shown in the drawing) extended toward the rear left and right sides from the head pipe 12; an engine 22 suspended from the main frames 21L, 21R; an exhaust pipe 23 extended from the engine 22; a muffler 24 connected to the exhaust pipe 23; a pivot member 25 provided at rear lower portions of the main frames 21L, 21R; and a pivot shaft 26 provided at the pivot member 25.

The motorcycle 10 further includes a rear swing arm 27 extended rearwardly from the pivot shaft 26 and incorporating a power transmission unit therein; a rear shock absorber or cushion unit 28 provided between the rear swing arm 27 and the main frames 21L, 21R and supporting the rear swing arm 27 so as to permit the latter to swing about the pivot shaft 26; a rear wheel axle 29 provided at a rear end portion of the rear swing arm 27; a rear wheel 31 as a drive wheel which is rotatably mounted to the rear wheel axle 29; and seat frames 33L, 33R (only 33L on the viewer's side is shown in the drawing) extended toward the rear upper side from rear end portions of the main frames 21L, 21R.

The layout of various components pertaining to an upper portion of the motorcycle is described below.

The motorcycle 10 includes the main frames 21L, 21R extended toward the rear left and right sides from the head pipe 12; a fuel tank 41 provided between the left and right main frames 21L, 21R; the seat frames 33L, 33R extended rearwardly from rear end portions 21Lb, 21Rb (only 21Lb on the viewer's side is shown in the drawing) of the main frames 21L, 21R; a seat 42, supported by the seat frame 33L, 33R, occupied by an operator of the motorcycle while operating the vehicle; and an air bag module 43 provided on the front side of the seat 42.

The air bag module 43 is disposed on the upper side of a rear portion 41b of the fuel tank 41, and is attached to stay members 45L, 45R (only 45L on the viewer's side is shown in the drawing) extended upwards from the left and right main frames 21L, 21R.

In the air bag module 43, an air bag, which is described later, is included in a folded state. In order to inflate the air bag at a predetermined time, a shock sensor 47 for detecting a shock exerted on the motorcycle 10 upon collision of the motorcycle 10 serving as a vehicle is disposed on the front fork 15L, and an air bag control unit 48 for controlling the inflation time of the air bag on the basis of a signal obtained through detection by the shock sensor 47 or the like is disposed at a lower rear portion in relation to the seat 42. The air bag module 43, the shock sensor 47 and the air bag control unit 48 are connected together with a harness (not shown).

A storage space 51 adapted to receive small things such as a wallet and an ETC unit 49 therein is provided on the upper side of a rear portion of the fuel tank 41 and on the rear side of the air bag module 43. A small-thing container 52 utilizing the storage space 51 is provided, thereby enhancing the utility for the rider(s).

A fuel supply system of the motorcycle is described below.

A fuel sub-tank 44 is disposed on the rear lower side of the fuel tank 41 and on the lower side of the seat 42, between the left and right seat frames 33L, 33R, as viewed from the upper side of the vehicle. A fuel pump 54 for feeding out a fuel to the engine 22 side is provided on the inside of the fuel sub-tank 44. The fuel tank 41 and the fuel sub-tank 44 are connected to each other by a pipe 53 for supplying the fuel to the fuel sub-tank 44 from the fuel tank 41. The fuel pump 54 is connected through a fuel hose 56 to a fuel supply system 55, which is provided at an intake unit of the engine 22. The intake unit supplies a fuel-air mixture to the engine.

According to the above configuration, the fuel from the fuel tank 41 is fed into the fuel sub-tank 44, is fed through the fuel pump 54 and the fuel hose 56, and is supplied to the engine 22 through the fuel supply system 55 provided in the vicinity of the engine 22. An air cleaner 57 is positioned so as to partly overlap the fuel tank 41 when viewed in side view. The air cleaner 57 supplies filtered air to the fuel supply system 55.

The motorcycle 10 further includes a side mirror 58 attached to the front cowl 36 for the rider to seek rearward views, a head light 59, a front fender 61, a radiator unit 62, a main cowl 63, a rear cowl 64, a rear fender 65, a tail lamp 66, a front disk brake unit 67, a main stand 69, a side trunk 71 attached to the seat frame 33L for storing luggage therein.

Now, a cowl stay 37 provided at a front portion of the vehicle is described below.

The motorcycle 10 is provided with the cowl stay 37, which is extended toward the front side of the left and right main frames 21L, 21R and which supports the front cowl 36 serving as a cowling 35 covering the vehicle.

The cowl stay 37 is arranged such that, when viewed in a side view of the vehicle, a front end portion 37a thereof is located on the rear side relative to a front end portion 17a of the front wheel 17 and on the front side relative to a front end portion 59a of the head light 59 provided on the front side of the head pipe 12 so as to illuminate the front side of the vehicle. The cowl stay 37 is disposed at a position above a center of gravity G of the vehicle. The detailed structure of the cowl stay 37 is described later.

Figure 2:
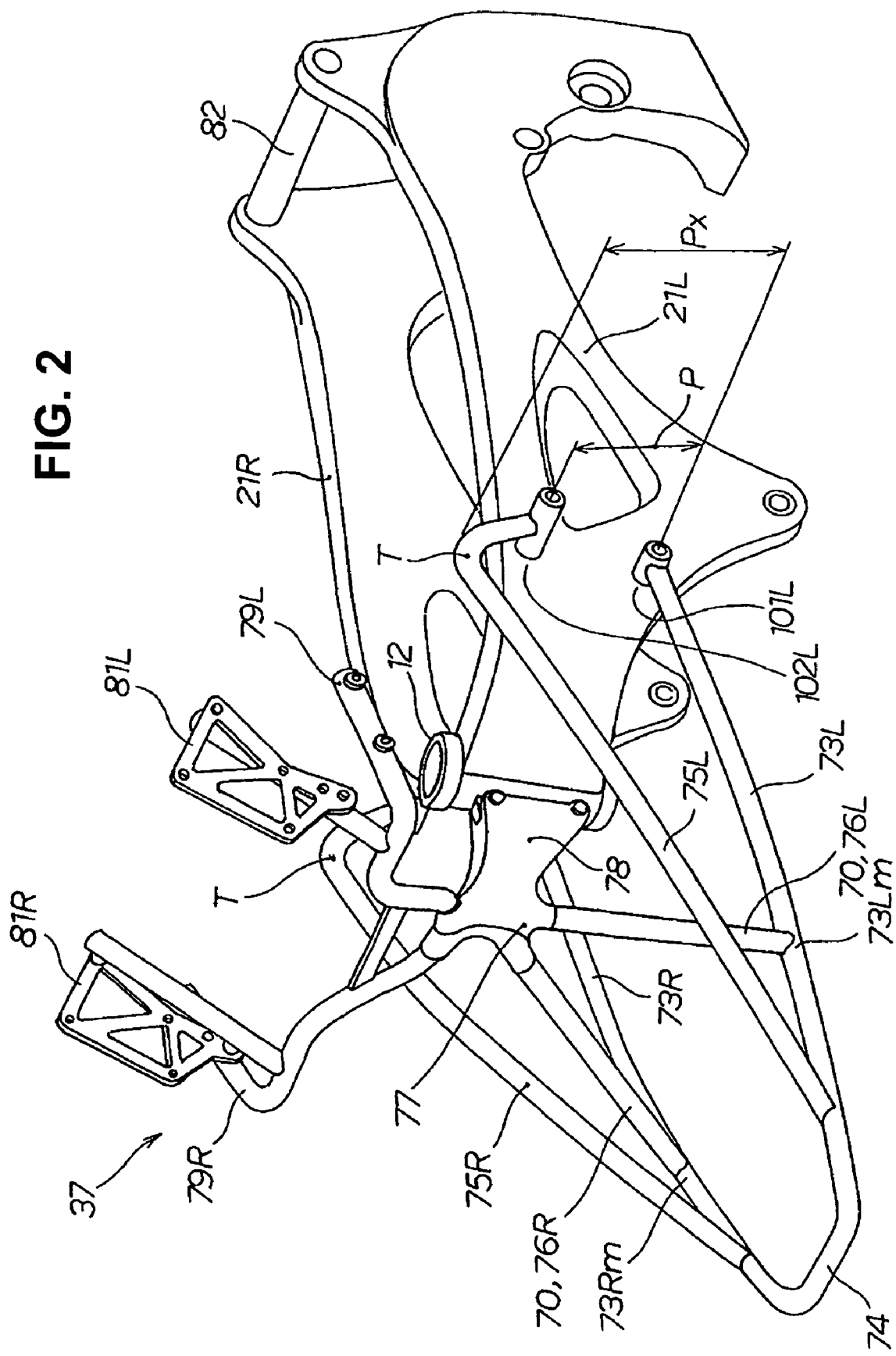
FIG. 2 is a perspective view of a cowl stay of the motorcycle according to the present invention.

FIG. 2 is a perspective view of the cowl stay provided in the motorcycle according to the present invention.

The cowl stay 37 includes left and right main cowl stay members 73L, 73R extending substantially horizontally in a forward direction from the main frames 21L, 21R; a cross member 74 connecting the front ends of the main cowl stay members 73L, 73R to each other; left and right slant members 75L, 75R respectively connecting intermediate members 73Lm, 73Rm of the main cowl stay members 73L, 73R to the main frames 21L, 21R to thereby reinforce the main cowl stay members 73L, 73R; and lower arm members 76L, 76R as arm members 70 extended toward the inner upper side from the left and right main cowl stay members 73L, 73R.

The cowl stay 37 further includes a connection portion 77 connecting the upper ends of the lower arm members 76L, 76R to each other; a center arm 78 extended from a front portion of the head pipe 12 to the connection portion 77 so as to support the connection portion 77; upper arm members 79L, 79R extended toward the left and right sides from the connection portion 77; and left and right cowl brackets 81L, 81R which are provided at tip portions of the upper arm members 79L, 79R and to which a front cowl 36 is attached. Thus, the cowl stay 37 is mounted to the main frames 21L, 21R and the head pipe 12. The main frames 21L, 21R are connected by a main cross member 82.

Here, connecting elements 101L, 101R (only symbol 101L on the viewer's side is shown in the drawing) at which the main cowl stay members 73L, 73R are mounted to the main frames 21L, 21R and connecting elements 102L, 102R (only symbol 102L on the viewer's side is shown in the drawing) at which the slant members 75L, 75R are mounted to the main frames 21L, 21R are different from each other, and the connecting elements 102L, 102R and the connecting elements 101L, 101R are spaced apart from each other by a spacing P in a vehicle height direction.

Figure 3:
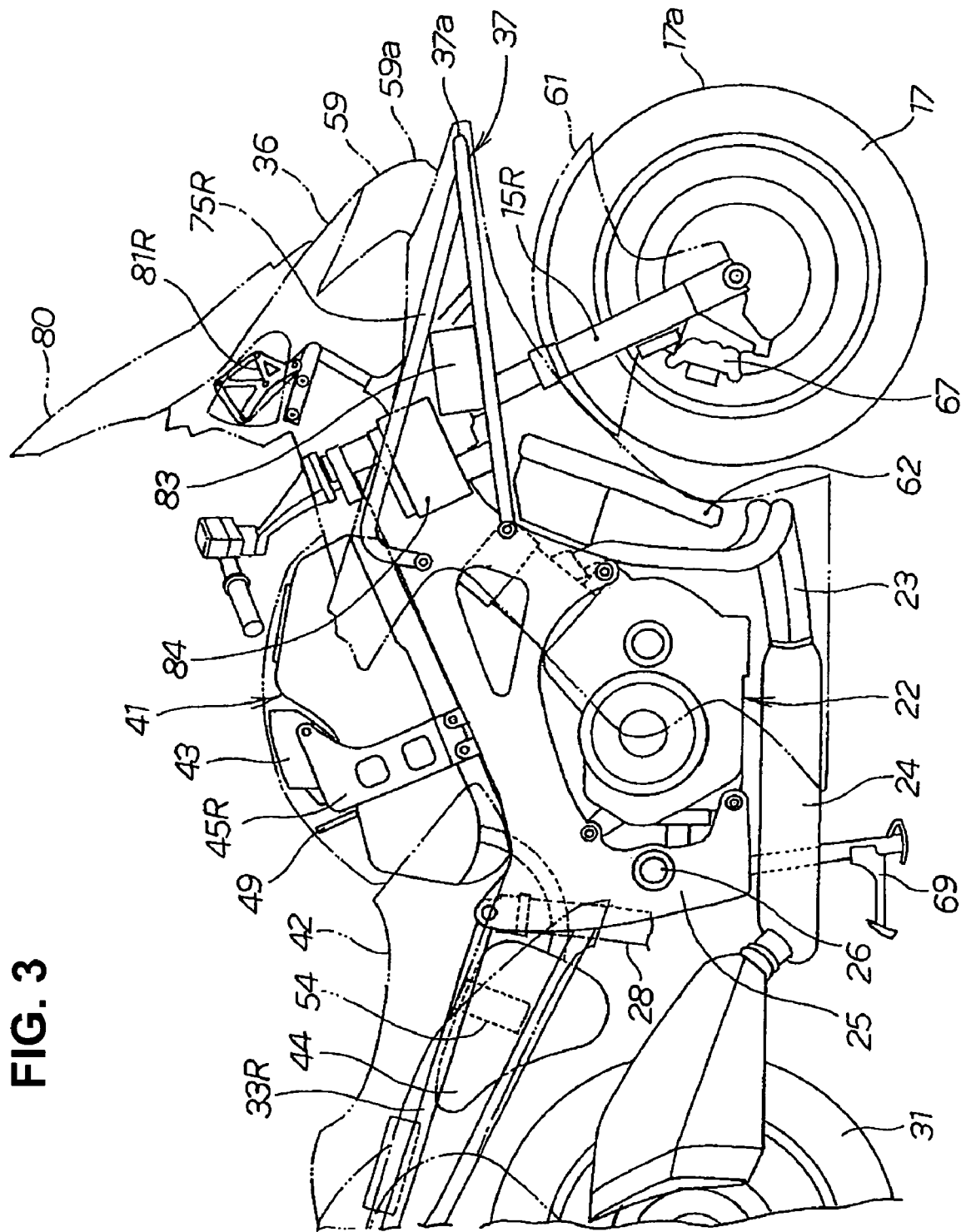
FIG. 3 is a side view of a right front portion of the motorcycle according to the present invention.

FIG. 3 is a side view of a right front portion of the motorcycle according to the present invention. In the cowl stay 37, a regulator 83 and a battery 84 are mounted to the right-side slant member 75R in this order from the front side toward the rear side.

Referring to FIGS. 1 to 3, the cowl stay 37 is mounted to the main frames 21L, 21R, so that the mounting strength of the cowl stay 37 can be significantly enhanced, as compared to a case in which the cowl stay 37 is mounted only to the head pipe 12.

The front cowl 36 formed as one body with a shield 80 covering the front side of the rider is attached to the cowl brackets 81L, 81R, and the head light 59 is attached thereto through a bracket (not shown). An engine control unit 85 and an ABS control unit 86 on the rear side of the engine control unit 85 are mounted to the left-side slant member 75L of the cowl stay 37, in this order from the front side toward the rear side. As discussed above, the regulator 83 and the battery 84 are mounted to the right-side slant member 75R of the cowl stay 37, in this order from the front side toward the rear side.

Accordingly, a desired center-of-gravity balance between the left and right portions of the motorcycle 10 can be ensured. Incidentally, since the cowl stay 37 is covered with the front cowl 36, the appearance quality of the vehicle can be kept good.

The cowl stay 37 includes the cross member 74 connecting the front ends of the main cowl stay members 73L, 73R to each other, and the left and right slant members 75L, 75R for connecting the intermediate members 73Lm, 73Rm of the main cowl stay members 73L, 73R to the main frames 21L, 21R. Therefore, the strength of the cowl stay 37 can be enhanced, as compared with a case in which only the main cowl stay members 73L, 73R are provided to constitute the cowl stay 37.

In addition, by utilizing the main cowl stay members 73L, 73R and the slant members 75L, 75R, it is possible, for example, to mount the regulator, the battery and the control units to the slant members 75L, 75R or the like. Since various component portions can be mounted to the main cowl stay members 73L, 73R and the slant members 75L, 75R, the degree of freedom in layout of the components in a front portion of the vehicle can be significantly enhanced.

Figure 4:
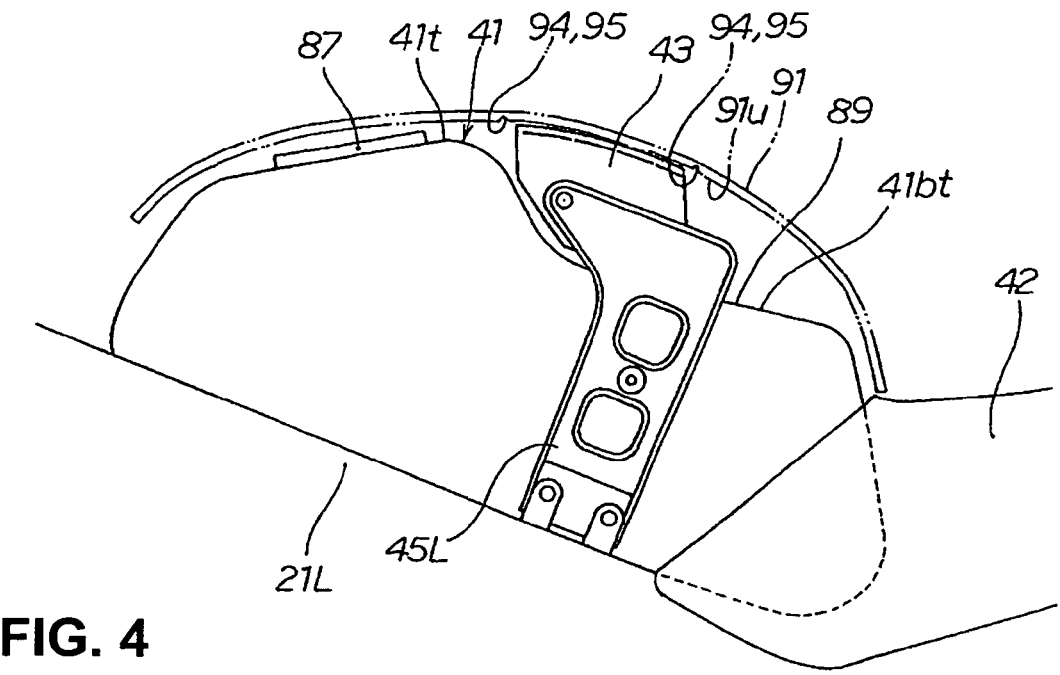
FIG. 4 is a side view of an air bag module disposed on a rear upper side portion of a fuel tank, and the surroundings of the same, according to the present invention.
Figure 5:
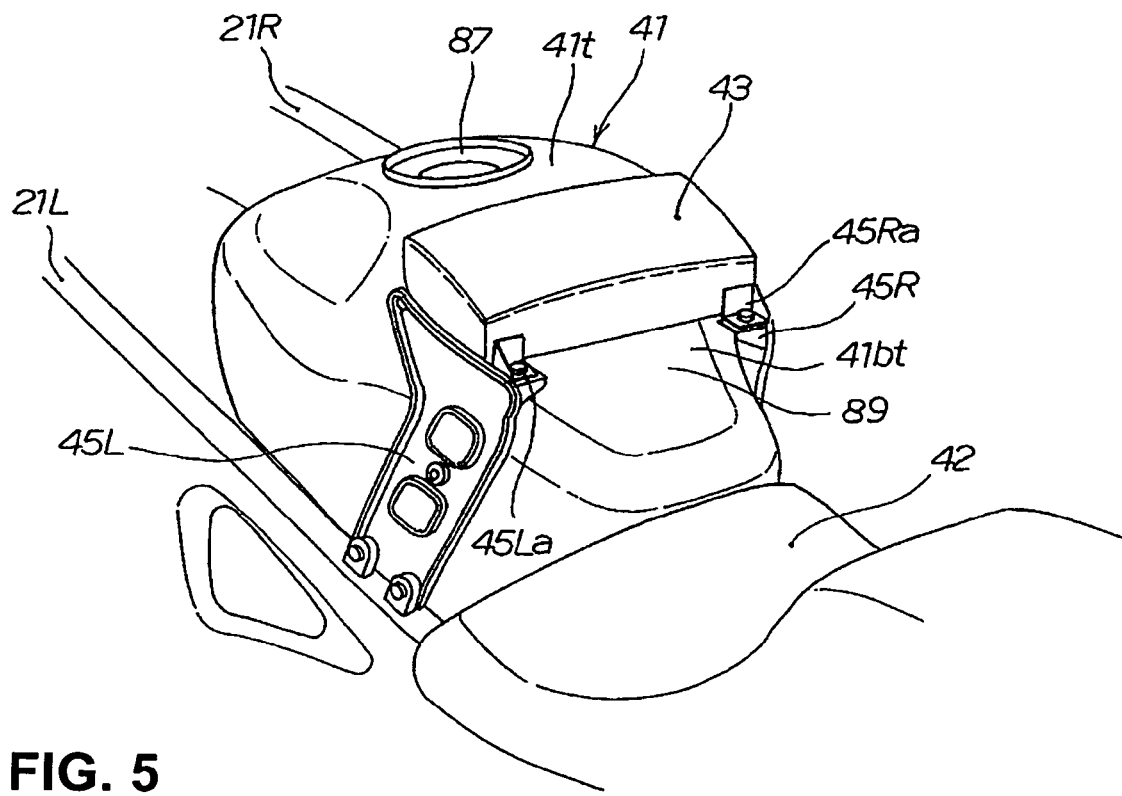
FIG. 5 is a perspective view of the air bag module disposed on the rear upper side portion of the fuel tank, and the surroundings of the same, according to the present invention.

FIG. 4 is a side view of the air bag module disposed on the upper side of a rear upper side portion of the fuel tank according to the present invention and the surroundings of the air bag module, and FIG. 5 is a perspective view of the air bag module disposed on the rear upper side portion of the fuel tank according to the present invention and the surroundings of the air bag module. In FIG. 5, a tank cover 91 is not shown.

The fuel tank 41 is disposed between the left and right main frames 21L, 21R, and is mounted to the main frames 21L, 21R. The fuel tank 41 is provided with a fuel tank feed port 87 at a front portion thereof, and is provided with a recess 89 at an upper rear surface 41bt thereof. The air bag module 43 is disposed in the recess 89.

More specifically, the air bag module 43 is mounted extending between left and right upper end portions 45La, 45Ra of the stay portions 45L, 45R extending upwardly from the left and right main frames 21L, 21R.

Since the recess 89 is provided at the upper rear surface 41bt of the fuel tank 41 and the air bag module 43 is disposed in the recess 89, the air bag module 43 is disposed such that it does not project from the upper surface 41t of the fuel tank 41.

When the air bag module 43 is disposed such that it does not project from the upper surface 41t of the fuel tank 41, ruggedness in the upper surface 41t of the fuel tank 41 can be suppressed, the upper surface 41t of the fuel tank 41 can be rendered neat, and the appearance quality of the fuel tank 41 and the surroundings thereof can be restrained from being lowered.

In addition, with the air bag module 43 disposed in the recess 89 formed at the upper rear surface of the fuel tank, the air bag at the time of inflation is inflated toward the rider, so that the air bag can be efficiently inflated without requiring any support belt.

In this embodiment, the fuel tank 41, the air bag module 43, and the stay members 45L, 45R are collectively covered with a tank cover 91. Therefore, the appearance quality of the fuel tank 41 and the surroundings can be enhanced largely, while permitting the air bag module 43 to be disposed in the vicinity of the rider.

Referring to FIG. 1, the seat frames 33L, 33R are provided respectively on the left and right sides, and the fuel sub-tank 44 is disposed between the left and right seat frames 33L, 33R as viewed from the upper side of the vehicle. Therefore, the reduction in the capacity of fuel due to the recess 89 provided in the fuel tank 41 can be compensated for by using the fuel sub-tank 44. Specifically, the reduction in the capacity of the fuel tank 41 due to the air bag module 43 contained in the recess 89 and to the air cleaner 57 so disposed as to overlap with the fuel tank 41 in side view can be compensated for by using the fuel sub-tank 44.

Further, the fuel sub-tank 44, accompanied by the fuel supply system 55, is disposed between the seat frames 33L, 33R. Therefore, when the fuel sub-tank 44 and the fuel supply system 55 are disposed in the vicinity of the engine 22, it is possible to realize both a lowering of the center of gravity G of the vehicle and concentration of mass. The lowering of the center of gravity G and the concentration of mass provides further enhancement in the driveability of the vehicle.

A lower surface 91u of the tank cover 91 is provided, at its portion facing the air bag module 43, with a fragile member 95 such as a notch element 94. The fragile member 95 is designed such that a portion on the side closer to the rider on the rear side in the front-rear direction of the vehicle is more fragile than a portion on the side remoter from the rider, whereby it is ensured that at the time of inflation of the air bag module 43, the air bag 97 can be inflated toward the rider's side.

Incidentally, while the fragile member 95 is the notch element 94 in this embodiment, the fragile member 95 may be a portion obtained by rendering the tank cover 91 thinner than the other portions.

The operation of the motorcycle having the air bag module and the cowl stay, as discussed above, is described below.

Figure 6A:
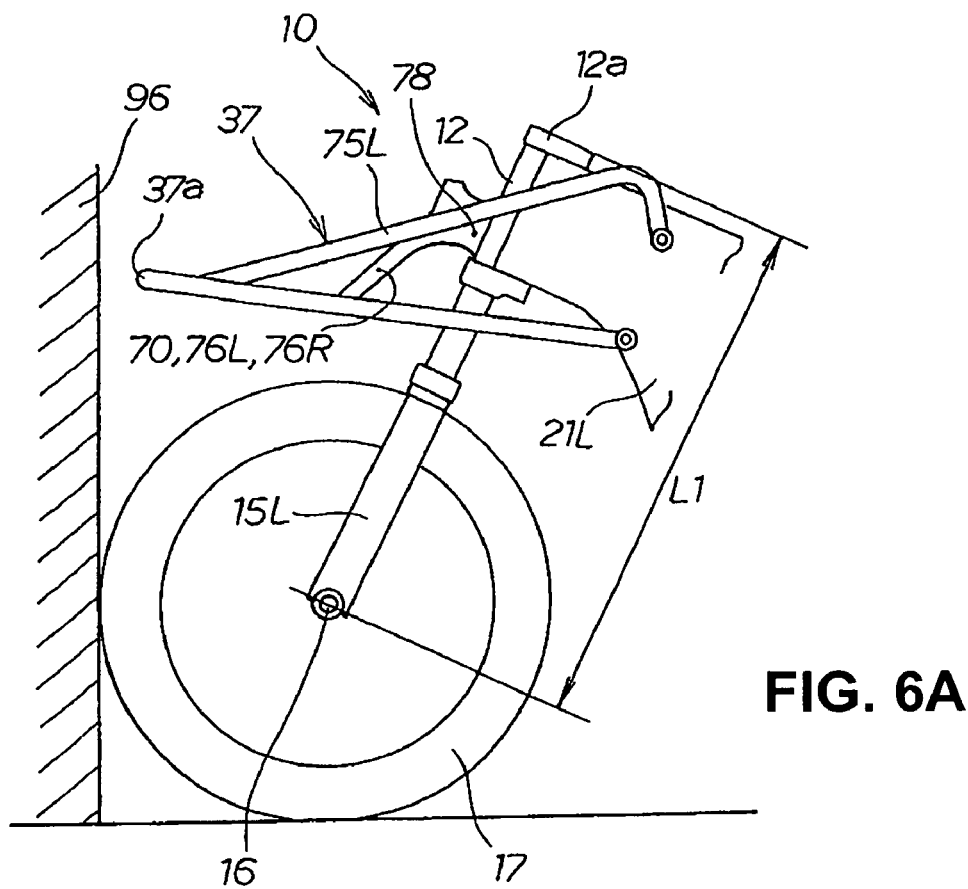
FIG. 6A in an illustration of an operation of the cowl stay, showing collision of a front wheel of the motorcycle against an object, according to the present invention.
Figure 6B:
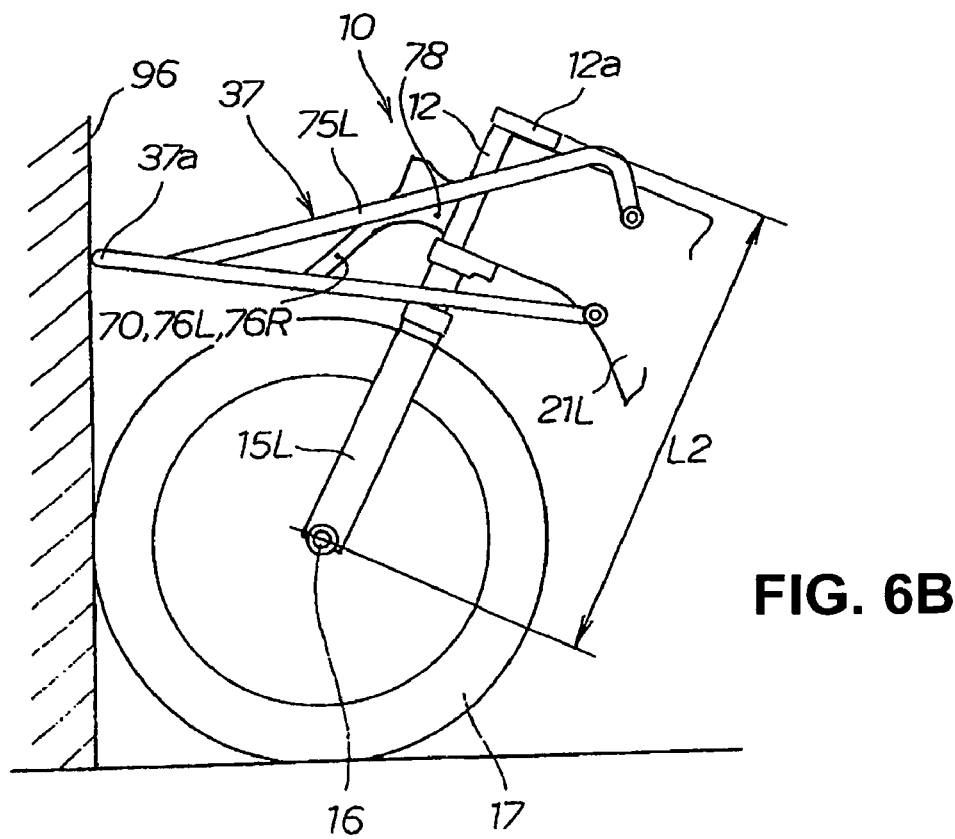
FIG. 6B in an illustration of an operation of the cowl stay, showing upon collision view having shrunk fork, according to the present invention.

FIGS. 6A and 6B illustrate the operation of the cowl stay according to the present invention.

FIG. 6A illustrates the collision of the front wheel 17 against an object 96, in a situation in which an excessively strong shock is exerted on the motorcycle 10, which serves as a vehicle, from the front side. In FIG. 6A, the distance between the front wheel axle 16 and the upper end portion 12a of the head pipe 12 is L1.

As shown in FIG. 6B, upon collision of the vehicle against the object 96, for absorbing the shock, the front forks 15L, 15R shrinks, and the vehicle body inclusive of the main frames 21L, 21R falls along the axial direction of the front forks 15L, 15R. In FIG. 6B, the distance between the front wheel axle 16 and the upper end portion 12a of the head pipe 12 is L2. It may be noted that L2<L1.

In a situation in which the motorcycle 10 receives an excessively strong impact force from the front side, the configuration in which the front forks 15L, 15R are disposed with their upper end portion inclined rearwards ensures that, upon receiving the shock, the main frames 21L, 21R fall along the axial direction of the front forks 15L, 15R and are moved forwards relative to the position of the front wheel 17, so that a front end portion 37a of the cowl stay 37 collides against the object 96.

The cowl stay 37 itself has sufficiently desired strength, through provision of the reinforcing slant members 75L, 75R (only symbol 75L on the viewer's side is shown in the drawing) or the like. In addition, the cowl stay 37 is mounted to the main frames 21L, 21R and the head pipe 12 at the plurality of connecting elements 101L, 101R, 102L, 102R, so that a sufficient mounting strength is ensured. Consequently, the cowl stay can function as a front bumper of the motorcycle 10.

In an arrangement in which the cowl stay 37 configured as discussed above is disposed on the upper side of the front wheel 17 and an excessively strong shock is exerted from the front side, the shock upon the collision against the object 96 is received by two points including the front wheel 17 and the cowl stay 37. Therefore, the change in the attitude of the motorcycle 10 can be suppressed, as compared with the situation in which the shock is received by the front wheel 17 alone.

Now, the operation of the cowl stay 37 referring to FIG. 2 is described below.

The main cowl stay members 73L, 73R and the slant members 75L, 75R are mounted on the main frames 21L, 21R at the different connecting elements 101L, 101R, 102L, 102R. Therefore, when a shock is inputted to the main cowl stay members 73L, 73R from the front side, the slant members 75L, 75R support the main cowl stay members 73L, 73R so as to suppress bending of the main cowl stay members 73L, 73R. Since the input from the front side is received by the plurality of different points, the rigidity of the cowl stay 37 can be enhanced. With the enhanced rigidity of the cowl stay 37, the change in the attitude of the vehicle can be suppressed more.

In addition, the slant member 75L, 75R are each formed in a substantially inverted V shape pointing to the upper side of the vehicle. Since the slant members 75L, 75R are each formed in the substantially inverted V shape, the main cowl stay members 73L, 73R are bent when an excessively strong shock is inputted from the front side.

Since the slant members 75L, 75R are each formed in the substantially inverted V shape, they are liable to be bent in such a direction as to be projected upwards, at the vertex portions T, T of the substantially inverted V shape. In this case, the spacing Px between the main cowl stay members 73L, 73R and the slant members 75L, 75R is enlarged, so that the possibility of a change in the attitude of the vehicle is lowered. Besides, a shock-absorbing effect can be provided.

The cowl stay 37 has the center arm 78 and the arm portions connecting the center arm 78 to the main cowl stay members 73L, 73R, so that the rigidity of the cowl stay 37 can be further enhanced. Since the main cowl stay members 73L, 73R provided in the cowl stay 37 are supported by the center arm 78 and the lower arm members 76L, 76R, as the arm members 70, as well as by the slant members, the possibility of concentration of a load on the slant members 75L, 75R can be lowered, as compared with a configuration in which only the slant members 75L, 75R are provided. With the possibility of concentration of a load on the slant members 75L, 75R thus lowered, the slant members 75L, 75R can be rendered lighter in weight, and a reduction in the weight of the cowl stay as a whole can be realized.

Figure 7A:
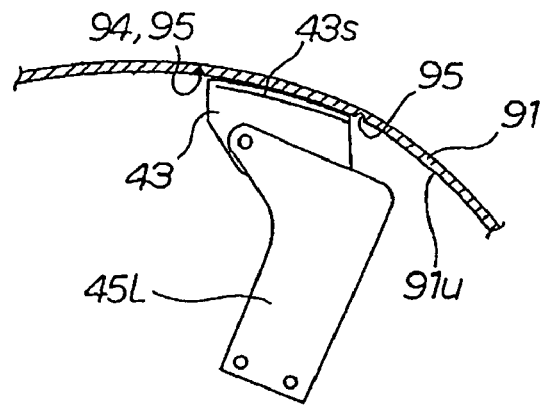
FIG. 7A is an illustration of an operation of the air bag module, showing the air bag module is in its non-operating state, according to the present invention.
Figure 7B:
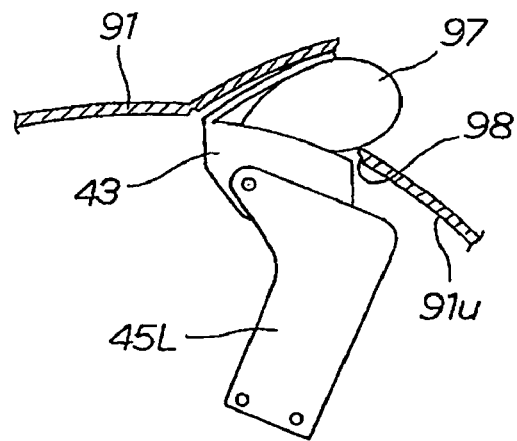
FIG. 7B is an illustration of an operation of the air bag module, showing the air bag module immediately upon its operation, according to the present invention.
Figure 7C:
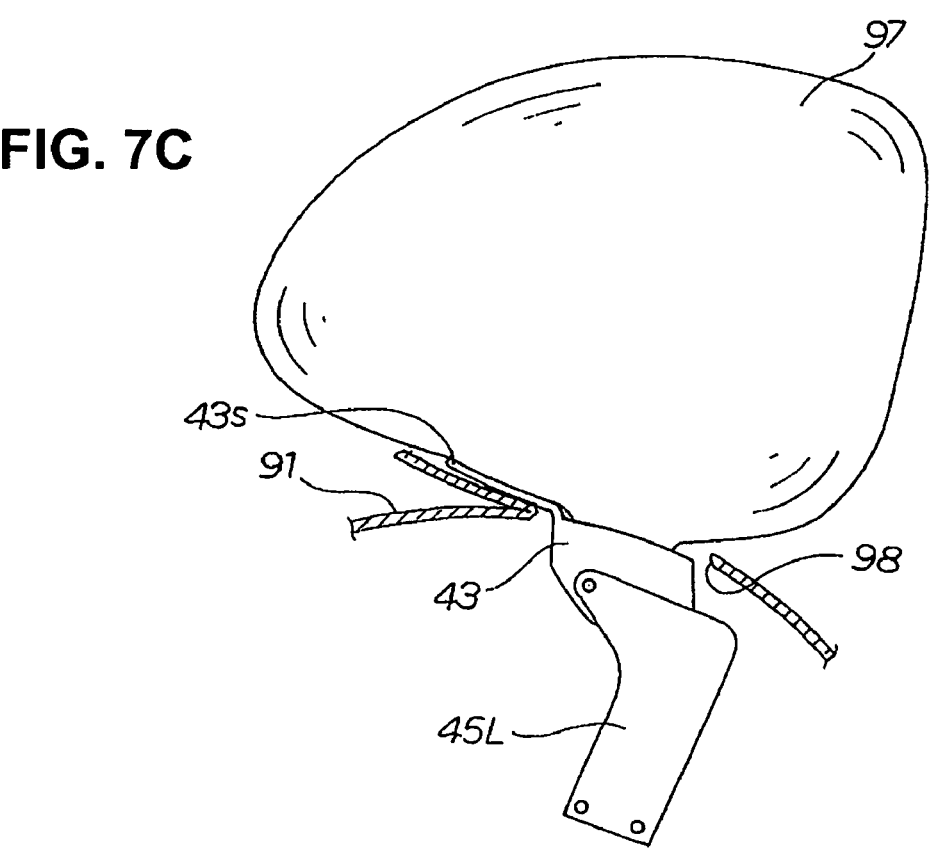
FIG. 7C is an illustration of an operation of the air bag module, showing the air bag module in operated state, according to the present invention.

FIGS. 7A through 7C illustrate the operation of the air bag module according to the present invention.

FIG. 7A is an illustration of the air bag module 43 in its non-operating state. The lower surface 91u of the tank cover 91 is provided, at its portion fronting on the air bag module 43, with the fragile member 95 inclusive of the notch element 94 or the like. When the air bag module 43 is in its non-operating state, the air bag module 43 is covered with the tank cover 91, whereby the appearance quality of the vehicle can be maintained.

FIG. 7B is an illustration of the air bag module 43 immediately upon its operation. The lower surface 91u of the tank cover 91 is provided, at its portion fronting on the air bag module 43, with the fragile member 95 inclusive of the notch element 94 or the like, and an upper surface portion 43s of the air bag module 43 is configured to be openable while being provided with a front hinge mechanism.

Therefore, when the air bag module 43 is operated, the upper surface portion 43s is opened by expansion of the air bag 97, and an opening 98 is formed in the fragile member 95, whereby expansion and inflation of the air bag 97 can be permitted to occur smoothly.

FIG. 7C is an illustration of the condition where the air bag module 43 is operated and the air bag 97 incorporated in the air bag module 43 is put into expansion and inflation. The air bag 97 is inflated toward the upper side of the tank cover 91.

In this embodiment of the present invention, the recess 89 in which to dispose the air bag module 43 is formed in the rear portion upper surface 41bt of the fuel tank 41. However, the position of the recess 89 may be any position, such as a front portion and an intermediate portion, of the upper surface of the fuel tank 41.

If the recess 89 can be disposed at an arbitrary position in the upper surface 41t of the fuel tank 41, the air bag 97 can be disposed at such a position that the air bag 97 can be operated more effectively in relation to the rider, according to the size of the air bag 97 or the like factors.

Figure 8A:
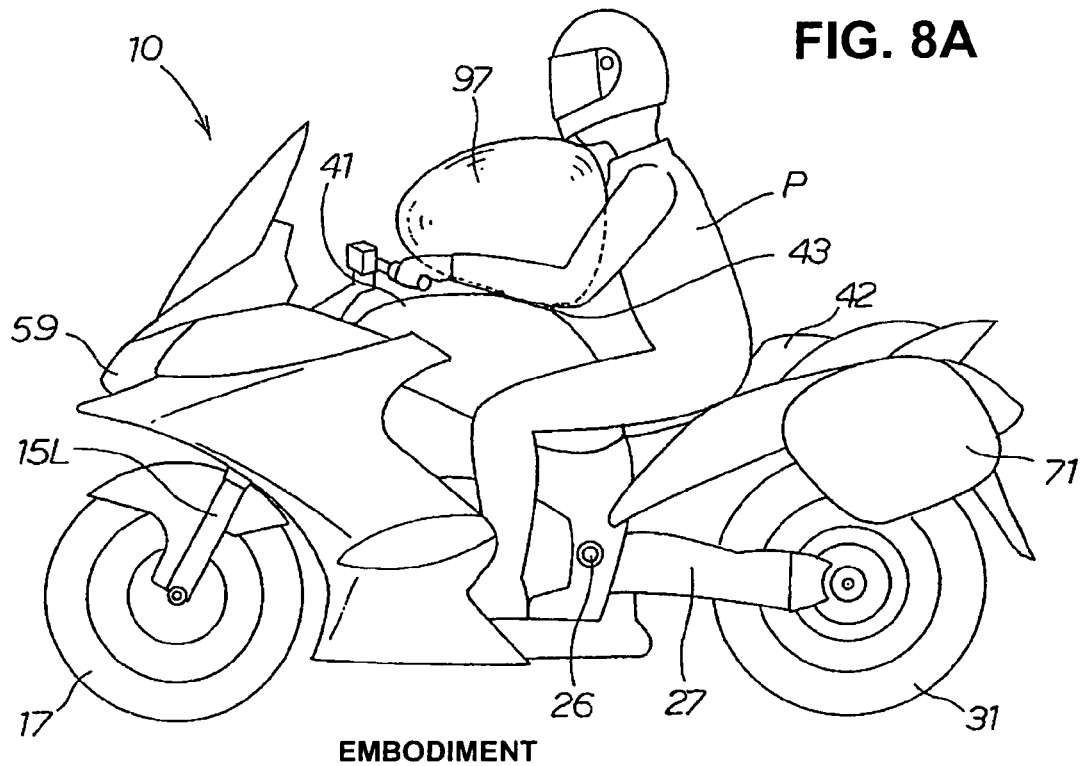
FIG. 8A is an illustration of the operation of the air bag module mounted to the motorcycle according to the present invention.
Figure 8B:
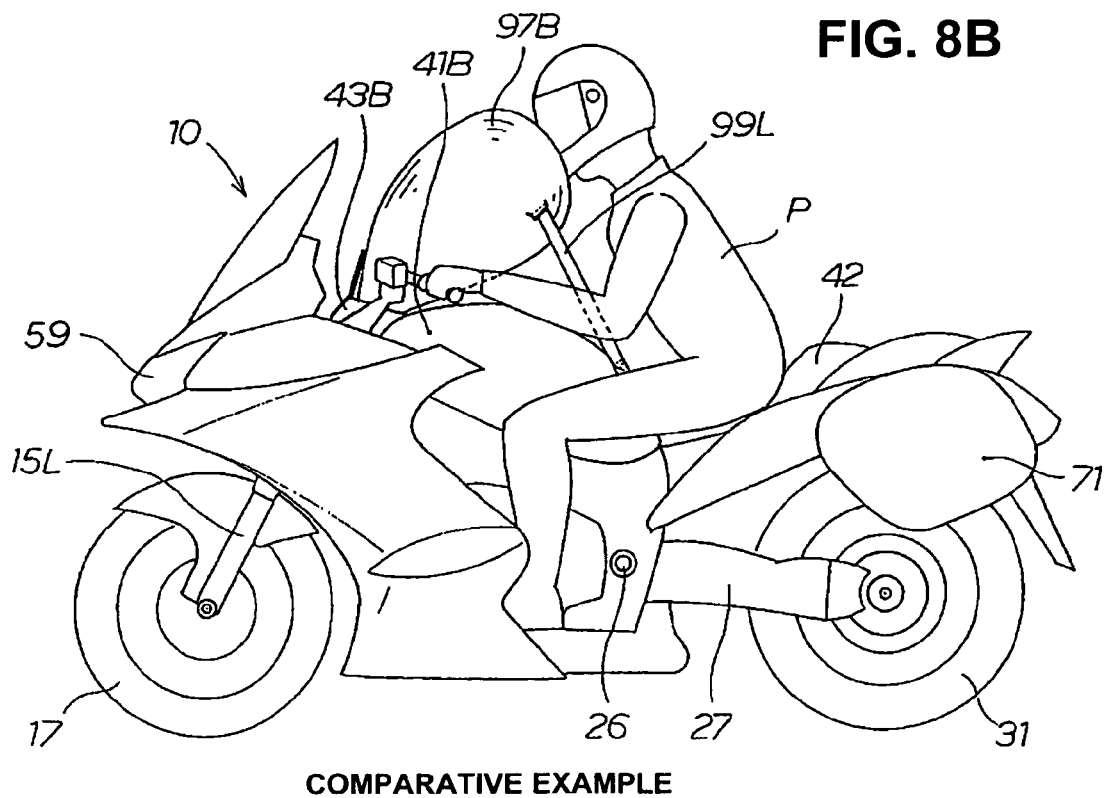
FIG. 8B is an illustration of the operation of the air bag module of a comparative example.

FIG. 8A shows an illustration of the operation of the air bag module provided in the motorcycle according to the present invention, and FIG. 8B shows an illustration of a comparative example.

FIG. 8A shows an embodiment of the present invention, illustrating that the air bag 97 disposed at the rear portion upper surface of the fuel tank 41 is inflated to come into contact with the rider P.

Since the air bag module 43 is disposed on the upper side of a rear portion of the fuel tank 41, the air bag module 43 can be disposed to be closer to the rider, as compared with the case where the air bag module 43 is disposed on the front side of the fuel tank 41.

FIG. 8B shows a comparative example, illustrating that an air bag 97B disposed on the front side of a fuel tank 41B is inflated to come into contact with the rider P. In this example, the air bag module 43 cannot be disposed close to the rider.

From this point of view, as shown in FIG. 8A, when the air bag 97 is inflated, the inflated air bag 97 can be inflated at a predetermined position, without using any support belts 99L, 99R (only 99L on the viewer's side is shown in the drawing) for supporting the inflated air bag 97 at the predetermined position.

In addition, the fuel tank 41 is disposed between the air bag module 43 and the seat 42. On the other hand, in FIG. 8A, the air bag module 43 is disposed at the rear portion upper surface 41bt of the fuel tank 41, whereby the air bag module 43 is disposed closer to the seat 42 on which to seat the rider(s). Therefore, the time from the moment of inflation of the air bag 97 to the moment of contact of the inflated air bag 97 with the rider can be shortened, as compared with the case where the air bag module 43 is disposed on the front side of the fuel tank 41.

Referring to FIGS. 6A and 6B also, the motorcycle 10 is provided with the cowl stay 37, and the air bag 97 is mounted thereto. The provision of the cowl stay 37 ensures that, when the motorcycle 10 equipped with the air bag 97 receives an excessively strong shock from the front side, the change in the attitude of the motorcycle 10 is suppressed.

With the change in the posture of the motorcycle 10 thus suppressed, the possibility of changes in the riding position and posture of the rider P is lowered. Consequently, when the air bag 97 is inflated, the positional accuracy in contact of the inflated air bag 97 with the rider P can be enhanced more, the air bag 97 is permitted to acts on the rider P more effectively, and the rider P can be protected more effectively.

Incidentally, while the motorcycle having both the cowl stay and the air bag module has been described in this embodiment, either one of the cowl stay and the air bag module may be omitted.

In a case in which a motorcycle is provided with a cowl stay, the cowl stay 37 is disposed at a height above the center of gravity G (FIG. 1) of the vehicle, so that the change in the attitude of the motorcycle 10 upon a head-on collision of the vehicle can be reduced more, as compared with the case where the cowl stay is disposed below or at the same level as the center of gravity G of the vehicle.

Incidentally, while the present invention has been applied to a motorcycle in this mode of carrying out the invention, the invention is applicable also to a saddle ride type vehicle.

In the first aspect of the present invention, the cowl stay may be disposed at the same level as or below the center of gravity of the vehicle.

In the second aspect of the present invention, the cowl stay may be mounted to other frame(s) than the main frames, for example, to the head pipe and/or the like.

In the third aspect of the present invention, the structure of the cowl stay may be set arbitrarily. For example, the cross member and the slant members may be partly or entirely omitted.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A motorcycle comprising:
a head pipe,
left and right main frames extending rearwardly from said head pipe toward left and right sides, respectively, and
a cowl stay extending toward a front side of said left and right main frames and supporting a cowling which covers a portion of the motorcycle, said cowl stay comprising:
left and right main cowl stay members extending forwardly from said main frames, a cross member connecting front ends of said main cowl stay members to each other; and
left and right slant members respectively connecting said main cowl stay members and said main frames to one another,
wherein said cowl stay is disposed such that, when viewed in side view of said motorcycle, a front end portion of said cowl stay is located rearwardly of a front end portion of a front wheel, and in front of a tip portion of a head light disposed on a front side of said head pipe so as to illuminate an area in front of said motorcycle.

2. The motorcycle as set forth in claim 1, wherein said cowl stay is disposed above a center of gravity of said motorcycle.

3. The motorcycle as set forth in claim 1, wherein said cowl stay is operatively attached to said main frames.

4. The motorcycle as set forth in claim 2, wherein said cowl stay is operatively attached to said main frames.

5. The motorcycle as set forth in claim 1, wherein respective connecting points at which said main stay members are mounted on said main frames and respective connecting points at which said slant members are mounted to respective said main frames are different from each other.

6. The motorcycle as set forth in claim 2, wherein respective connecting points at which said main stay members are mounted on said main frames and respective connecting points at which said slant members are mounted to respective said main frames are different from each other.

7. The motorcycle as set forth in claim 3, wherein respective connecting points at which said main stay members are mounted on said main frames and respective connecting points at which said slant members are mounted to respective said main frames are different from each other.

8. The motorcycle as set forth in claim 1, wherein when viewed in side view, each of said slant members is formed in a substantially inverted V shape pointing upwardly.

9. The motorcycle as set forth in claim 2, wherein when viewed in side view, each of said slant members is formed in a substantially inverted V shape pointing upwardly.

10. The motorcycle as set forth in claim 3, wherein when viewed in side view, each of said slant members is formed in a substantially inverted V shape pointing upwardly.

11. The motorcycle as set forth in claim 1, wherein said cowl stay further comprises a center arm extending forwardly from said head pipe and arm members connecting said center arm to said main cowl stay members.

12. The motorcycle as set forth in claim 1, further comprising:
a seat arranged on the rear portion of said main frames; and
an air bag module disposed at a position proximate to a front portion of said seat.

13. The motorcycle as set forth in claim 2, further comprising:
a seat arranged on the rear portion of said main frames; and
an air bag module disposed at a position proximate to a front portion of said seat.

14. The motorcycle as set forth in claim 3, further comprising:
a seat arranged on the rear portion of said main frames; and
an air bag module disposed at a position proximate to a front portion of said seat.

15. A motorcycle comprising:
a main frame unit having
   a head pipe;
   left and right main frames extending rearwardly from said head pipe towards left and right sides, respectively; and
   seat frames extending rearwardly from rear end portions of respective said left and right main frames; said seat frames supporting a seat thereon;
a cowl stay extending toward a front side of said left and right main frames and supporting a cowling covering a portion of the motorcycle, said cowl stay comprising:
   left and right main cowl stay members extending forwardly from said main frames, a cross member connecting front ends of said main cowl stay members to each other; and
   left and right slant members respectively connecting said main cowl stay members and said main frames to one another,
wherein said cowl stay is disposed such that, when viewed in a side view of said motorcycle, a front end portion of said cowl stay is located rearwardly of a front end portion of a front wheel and in front of a tip portion of a head light disposed on the front side of said head pipe so as to illuminate an area in front of said motorcycle.

16. A motorcycle according to claim 15, wherein said cowl stay is disposed at a position located above a center of gravity of said motorcycle.

17. In a motorcycle comprising a head pipe, and main frames extending from said head pipe toward rear left and right sides, the improvement comprising a cowl stay mounted on said main frames, said cowl stay extending toward a front side of said left and right main frames and supporting a cowling covering a portion of the motorcycle,
   said cowl stay comprising left and right main cowl stay members extending forwardly from said main frames,
   a cross member connecting front ends of said main cowl stay members to each other;
   left and right slant members connecting said main cowl stay members and said main frames to each other;
   a center arm extending forwardly from said head pipe; and
   arm members connecting said center arm to said main cowl stay members;
   wherein said cowl stay is disposed such that, when viewed in side view of said motorcycle, a front end portion of said cowl stay is located rearwardly of a front end portion of a front wheel, and in front of a tip portion of a head light disposed on said head pipe; and
   wherein said cowl stay is disposed at a position located above a center of gravity of said motorcycle.

\* \* \* \* \*